United States Patent [19]

Weiss et al.

[11] Patent Number: 4,758,788
[45] Date of Patent: Jul. 19, 1988

[54] METAL DETECTOR FOR INTAKE OF FIELD CHOPPER

[75] Inventors: Burkhard Weiss, Weigsdorf-Köblitz; Arthur Hauschild, Sebnitz; Erich Herrmann, Polenz, all of German Democratic Rep.

[73] Assignee: Veb Kombinat Fortschritt Landmaschinen, Neustadt, German Democratic Rep.

[21] Appl. No.: 946,427

[22] Filed: Dec. 23, 1986

[30] Foreign Application Priority Data

Dec. 24, 1985 [DD] German Democratic Rep. ... 285427

[51] Int. Cl.⁴ .................. A01D 75/28; G01R 33/12; G08B 21/00
[52] U.S. Cl. .................. 324/243; 56/10.2; 324/241; 340/551; 340/684
[58] Field of Search .............. 324/228, 239–243, 324/262, 326–329; 340/551, 684; 56/10.2

[56] References Cited

U.S. PATENT DOCUMENTS

| | | | |
|---|---|---|---|
| 3,889,249 | 6/1925 | Bennett, Jr. et al. | 56/10.2 X |
| 3,964,042 | 6/1976 | Garrott | 324/239 X |
| 3,972,156 | 8/1976 | Bennett, Jr. et al. | 56/10.2 |
| 4,290,255 | 9/1981 | Martenas | 56/10.2 |
| 4,433,528 | 2/1984 | Bohman | 56/10.2 |

FOREIGN PATENT DOCUMENTS 2430147 7/1985 Fed. Rep. of Germany .

OTHER PUBLICATIONS

Wie Funktioniert der Metalldetektor?, by Werner Geuggel, Agratechnik International–Apr. 1983, pp. 17, 18, 19, 21.

*Primary Examiner*—Gerard R. Strecker
*Attorney, Agent, or Firm*—Herbert Dubno; Andrew Wilford

[57] ABSTRACT

An apparatus for detecting magnetically sensible objects in an object stream longitudinally passing a predetermined location, for instance at the intake end of the conveyor of a field chopper, has according to the invention a support at the location extending transversely adjacent the object stream and having a pair of transverse ends and a center therebetween and a magnet assembly on the support having a north pole directed from between one of the ends and the center of the support transversely of the support and of the stream into the crop stream and a south pole directed parallel to the north pole from between the other end and the center of the support. The assembly forms between its poles a magnetic field having lines of force extending mainly transversely through the stream. Respective north and south sensing coils at least partially surround the respective poles so that a magnetically sensible object perturbing the field will generate respective currents in the coils. Conductors connect the coils in series such that the currents generated therein by perturbation of the field by a magnetically sensible object are added together and a controller is connected to the coils for reacting, for instance by sounding or illuminating an alarm or by shutting down the conveyor drive, when the currents exceed a predetermined minimum.

6 Claims, 2 Drawing Sheets

METAL DETECTOR FOR INTAKE OF FIELD CHOPPER

FIELD OF THE INVENTION

The present invention relates to a metal detector. More particularly this invention concerns such a detector which is provided in the intake of a field chopper or the like.

BACKGROUND OF THE INVENTION

A field chopper has at its front end a cutting unit that severs a standing crop, e.g. corn, at the base. The cut crop is moved back in the machine by conveyor rollers which compact it into a stream and feed it to a chopper which comminutes the cut crop and blows it out of the machine, typically via a tube or chute to a takeoff trailer or truck.

Hard objects that get past the front end cutter can pose a grave danger to the high-speed blades of the chopping drum. Accordingly commonly owned patent application Ser. Nos. 914,633 and 914,634 now U.S. Pat. No. 4,720,963 filed Oct. 2, 1986 describe systems for detecting such hard objects by reacting to the difference between the hard mass of such an object and the invariably softer crop.

Unfortunately metallic objects, normally pieces of wire or nails in pieces of wood, are occasionally found in or near a standing crop and are too small to be detected by these systems. Such objects can pose as great a danger to the chopping assembly as larger nonmetallic objects due to their considerable strength.

Accordingly it is known to provide electromagnetic detectors that can sense metallic objects, iron and steel ones being the principal problems. To detect such objects, German patent document No. 2,252,595 has permanent or electromagnets distributed over the width of the object stream so as to form a field whose lines of force run in the object transport direction, that is the direction the object stream is moving in. Two symmetrical coils are provided in this field which are offset relative to each other such that the blind spot any coil will inherently have in its center is covered by the other coil.

Such coils are quite expensive to manufacture, and two are absolutely necessary to scan the entire stream. Furthermore the device can occasionally be fooled when two objects symmetrically enter the field, something that happens often enough to be a problem. Thus this system, in addition to being expensive, is not capable of sensing all incoming objects.

German patent No. 2,430,147 describes a system wherein two separate magnets create separate but opposite fields whose lines of force extend parallel to the displacement direction of the stream through this field. The entire arrangement is surrounded by a coil. Such an arrangement also has a blind spot so that its application is also limited.

A system (See *Agrartechnik international* of April 1986) is known wherein the magnetic detecting system is mounted wholly within one of the feed rollers of the conveyor system. Once again the magnetic field produced extends in the direction of transport of the goods, being created by a north pole between two south poles. The north pole piece is provided with the detecting coil. This arrangement also can only detect magnetic objects that are relatively close, making use at the downstream end of the conveyor path where the stream is relatively thick impossible. The sensitivity also drops off so very much at the edges of the stream that there is virtually no detection here. Furthermore the long narrow sensing coil is particularly difficult and, therefore, expensive to manufacture.

In sum, none of the proposed solutions is highly sensitive across the entire cross section of the object stream being scanned for metallic objects. In addition all the known devices are expensive to manufacture and of normally relatively complex construction.

OBJECTS OF THE INVENTION

It is therefore an object of the present invention to provide an improved apparatus for detecting magnetically sensible objects.

Another object is the provision of such an apparatus for detecting magnetically sensible objects which overcomes the above-given disadvantages, that is which is highly sensitive over the entire section of the object stream and that also is of relatively simple and inexpensive construction.

SUMMARY OF THE INVENTION

An apparatus for detecting magnetically sensible objects in an object stream longitudinally passing a predetermined location, for instance at the intake end of the conveyor of a field chopper, has according to the invention a support at the location extending transversely adjacent the object stream and having a pair of transverse ends and a center therebetween and a magnet assembly on the support having a north pole directed from between one of the ends and the center of the support transversely of the support and of the stream into the crop stream and a south pole directed parallel to the north pole from between the other end and the center of the support. The assembly forms between its poles a magnetic field having lines of force extending mainly transversely through the stream. Respective north and south sensing coils at least partially surround the respective poles so that a magnetically sensible object perturbing the field will generate respective currents in the coils. Conductors connect the coils in series such that the currents generated therein by perturbation of the field by a magnetically sensible object are added together and a controller is connected to the coils for reacting, for instance by sounding or illuminating an alarm or by shutting down the conveyor drive, when the currents exceed a predetermined minimum.

When a magnetically sensible object, for instance a nail, perturbs this field it will generate opposite voltages in the coils which will be added together to produce an analog output. Typically the controller includes a comparator which compares this analog output as an actual value with a set point that is determined by how large a piece of metal can be considered still small enough to let pass. Use of the sum of these two voltages, rather than their difference as in the prior-art two-coil systems, allows the system to operate with great sensitivity.

According to the invention each pole is formed of at least two pole pieces and the respective coils are wrapped only around one of the respective pole pieces. More particularly each pole is formed of at least two respective end pole pieces and a respective center pole piece therebetween and the respective coils are wrapped only around the respective center pole pieces. Each such coil is annular and centered on a respective axis generally perpendicular to the stream. These axes are parallel.

The magnet assembly according to the invention is formed of a magnetically permeable bar having a face turned toward the stream and a pair of transversely spaced permanent magnets sitting on the face and oppositely directed to form the respective poles. The effect is to create a U-magnet.

DESCRIPTION OF THE DRAWING

The above and other features and advantages will become more readily apparent from the following, reference being made to the accompanying drawing in which.

SPECIFIC DESCRIPTION

Figure 1:
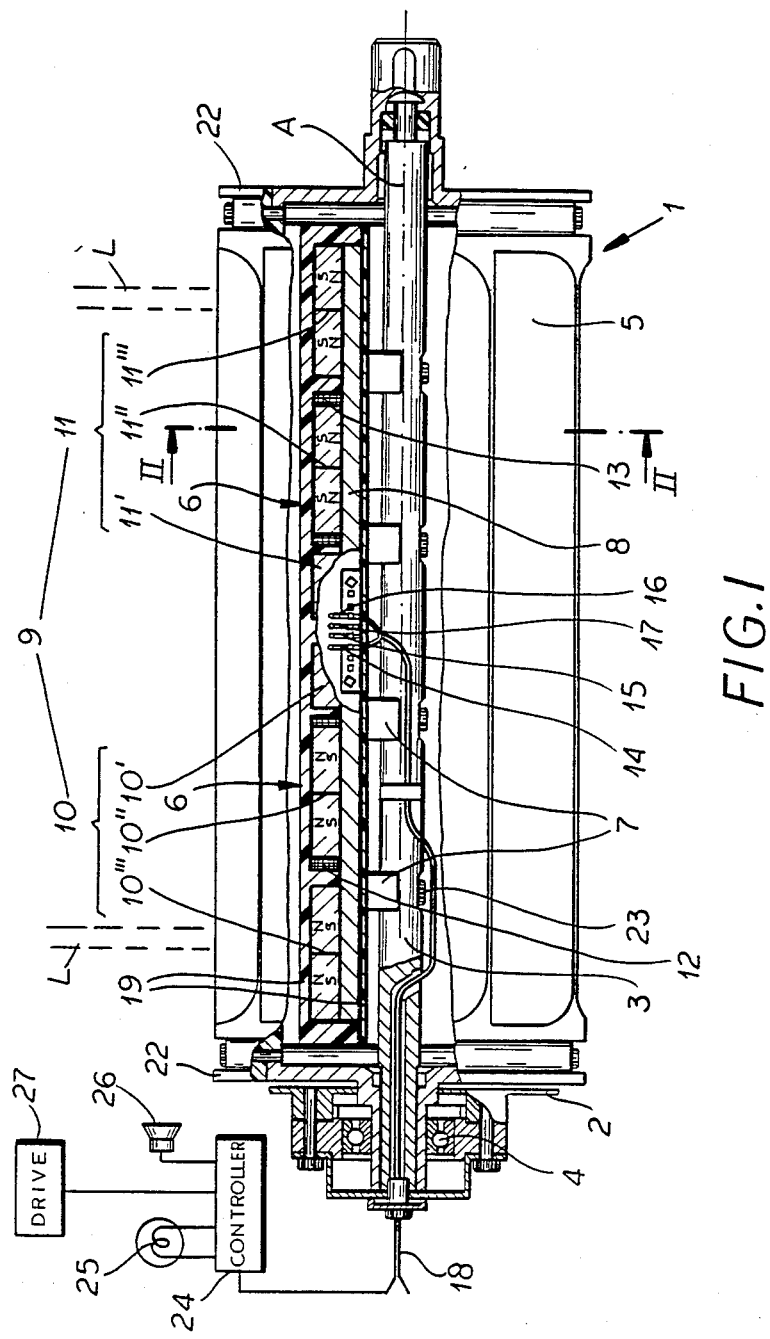
FIG. 1 is an axial section through a feed-roller and some surrounding structure in small scale.
Figure 2:
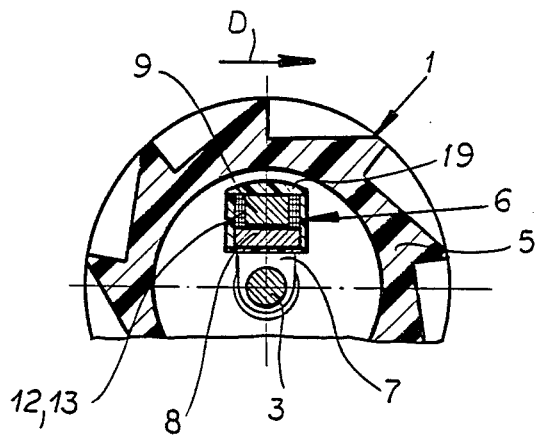
FIG. 2 is a cross section taken along line II—II of FIG. 1.

As seen in FIG. 1 a feed for a field chopper has a housing having a side wall 2 normally vertical, typically in the intake unit just downstream of the cutting assembly, for instance a sickle bar, and upstream of a chopping/blowing unit of a field chopper or the like. A stream of cut crop, which can include pieces of wire or nails that got past the cutter, moves as seen in FIG. 2 in direction D over a roller 1 having a helically ridged and cylindrically hollow synthetic-resin body 5 having end caps 22 supported in bearings 4 (only one shown in FIG. 1) in the housing wall 2 for rotation about a horizontal axis A perpendicular to this direction D. As a rule the roller 1 is rotated by a drive 27 to advance the cut crop back to the chopping unit while compacting and crushing the crop.

A support shaft 3 centered on the axis A is journaled in the end caps 22 and fixed on the housing wall 2. Attached to its upper side inside the roller body 5 is a magnetic sensor 6 held in place by clips 7 and having a base plate 8 of a material of good magnetic permeability, e.g. soft iron, supporting a six-part magnet assembly 9. The clips 7 can sit on the shaft 3 as shown in FIG. 1 with bolts 23 securing the magnet asembly 9 in place, or they can go completely around the shaft 3 as shown in FIG. 2. The magnet assembly 9 itself has one pole unit 10 at one axial end of the roller 1 and the opposite pole unit 11 at the opposite end. This produces a magnetic field whose lines L of force extend upward and perpendicular to the transport direction D of the crop, and underneath the magnet assembly 9 flux is through the bar 8.

Figure 3:
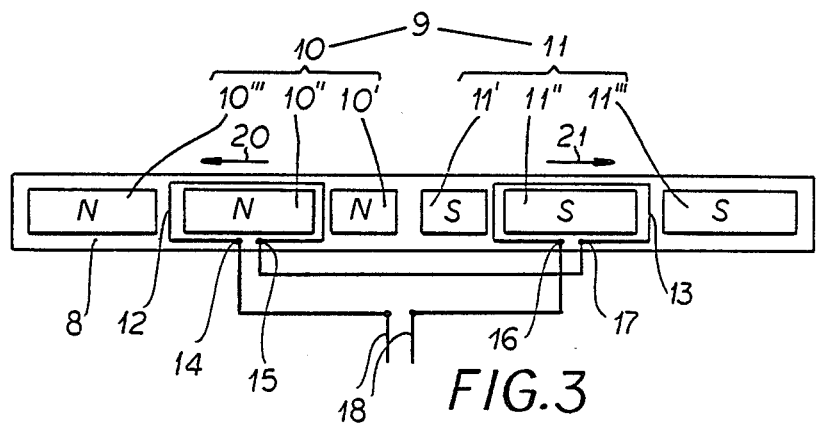
FIG. 3 is a mainly diagrammatic view illustrating the layout of the magnet assembly of this invention.

As illustrated the pole unit 10 is the north pole and is formed of the north poles of three vertical and axially aligned magnets 10', 10", and 10''' next to each other on the return bar 8 and the pole unit 11 is the south pole and is formed of the south poles of three vertical and axially aligned magnets 11', 11", and 11''' on the bar 8. The two magnets 10' and 11' closest to the center are half the size of the other magnets 10", 10''', 11", and 11''', this effect being achieved by forming each of the magnets 10", 10''', 11", and 11''' of two adjacent permanent bar magnets and each of the magnets 10' and 11' of only one such magnet. In addition respective multiturn windings or coils 12 and 13 are wound around the middle magnets 10" and 11" and have respective leads 14, 15 and 16, 17 that are connected up so the coils 12 and 13 are in series but oppositely wound, that is as seen in FIG. 3 the right-hand leads 15 and 17 are connected together and the left-hand leads 14 and 16 to output lines 18. The entire unit is protected in synthetic-resin potting 19 from moisture and dust.

When a magnetically sensible object, such as a piece of iron fencing, moves past the permanent-magnet assembly 9 it generates opposite voltages as illustrated by arrows 20 and 21 in the coils 12 and 13. These voltages are automatically added by the series connection and fed via the output lines 18 to a controller 24 which can illuminate a visible alarm lamp 25, sound an alarm from a horn 26, or stop the drive 27 that rotates the feed drum 1.

Figure 4:
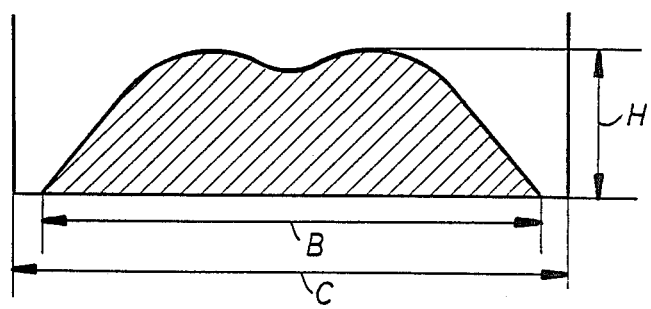
FIG. 4 is a diagram on which the sensitivity of the sensor of this invention is plotted against the location in the passing crop stream.

FIG. 4 shows on the ordinate the sensitivity H of the magnet assembly 9 according to this invention and on the abscissa the width C of the passage through which the crop stream passes and the width B of the magnet assembly 9. Plainly the system of this invention is most sensitive in the normally crowded central region.

In tests against the prior-art devices where the lines of force of the generated field run in the direction of displacement of the crop stream being scanned for metallic objects, a 60 g object was detected 100% of the time by the system of this invention when the chopper was operating at maximum conveying speed as opposed to 25% of the time for the prior-art device. This was primarily due to the fact that the sensitivity range of the system of this invention was five times longer, 80 mm, than the 16 mm range of the prior-art system. These advantages in operational efficiency are in addition to the fact that the system of this invention can be produced at relatively low cost.

We claim:

1. An apparatus for detecting magnetically sensible objects in a crop stream longitudinally passing a predetermined location, at the intake end of the conveyor of a field chopper, the apparatus comprising:
    an elongated support at the location extending transversely adjacent and spaced from the crop stream and having a pair of transverse ends and a center therebetween;
    a magnet assembly on the support having
        a north pole unit directed from one side of said magnet assembly between one of the ends and the center of the support transversely of the support and of the stream toward the crop stream,
        a south pole unit directed from said one side of said magnet assembly parallel to the north pole unit from between the other end and the center of the support transversely of the support and of the stream toward the crop stream,
    said apparatus further comprising:
        a magnetically permeable return element extending between the pole units on a side of said assembly opposite said one side, the assembly forming between the pole units a magnetic field having lines of force extending on said one side mainly transversely through the stream and on said opposite side through the return element;
        respective north and south sensing coils at least partially surrounding the respective pole units, whereby a magnetically sensible object perturbing the field will generate respective currents in the coils;

conductors connecting the coils in series such that the currents generated therein by perturbation of the field by a magnetically sensible object are added together; and control means connected to the coils for reacting when the currents exceed a predetermined minimum.

2. The sensing apparatus defined in claim 1 wherein each pole unit is formed of at least two pole pieces, the respective coils being wrapped only around one of the respective pole pieces.

3. The sensing apparatus defined in claim 1 wherein each pole unit is formed of at least two respective end pole pieces and a respective center pole piece therebetween, the respective coils being wrapped only around the respective center pole pieces.

4. The sensing apparatus defined in claim 3 wherein each coil is annular and centered on a respective axis generally perpendicular to the stream, the axes being parallel.

5. The sensing apparatus defined in claim 1 wherein the return element is a magnetically permeable bar having a face turned toward the stream and each of the pole units is a respective pair of transversely spaced permanent magnets sitting on the face and oppositely directed to form the respective pole units.

6. The sensing apparatus defined in claim 1 wherein the control means includes an alarm and the control means reacts by activating the alarm.

* * * * *